United States Patent
Makita

(10) Patent No.: US 8,338,328 B2
(45) Date of Patent: Dec. 25, 2012

(54) ELECTROLYTIC SOLUTION AND ELECTROCHEMICAL DEVICE

(75) Inventor: Kengo Makita, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 12/675,666

(22) PCT Filed: Sep. 29, 2008

(86) PCT No.: PCT/JP2008/067625
§ 371 (c)(1),
(2), (4) Date: Feb. 26, 2010

(87) PCT Pub. No.: WO2009/044696
PCT Pub. Date: Apr. 9, 2009

(65) Prior Publication Data
US 2011/0045385 A1  Feb. 24, 2011

(30) Foreign Application Priority Data
Oct. 2, 2007  (JP) ................ P2007-258400

(51) Int. Cl.
*B01J 23/48*  (2006.01)

(52) U.S. Cl. ..................... 502/348; 429/428

(58) Field of Classification Search ............... 429/428; 502/347, 348, 439
See application file for complete search history.

(56) References Cited

U.S. PATENT DOCUMENTS

| | | |
|---|---|---|
| 2003/0134163 A1 | 7/2003 | Markoski et al. |
| 2004/0072047 A1 | 4/2004 | Markoski et al. |
| 2006/0035136 A1 | 2/2006 | Markoski et al. |
| 2007/0003801 A1 | 1/2007 | Koizumi |
| 2007/0037030 A1 | 2/2007 | Ogami et al. |
| 2008/0026265 A1 | 1/2008 | Markoski et al. |
| 2008/0070076 A1 | 3/2008 | Makita et al. |

FOREIGN PATENT DOCUMENTS

| | | |
|---|---|---|
| JP | 60-062064 | 4/1985 |
| JP | 61-078067 | 4/1986 |
| JP | 62-246265 | 10/1987 |
| JP | 07-090111 | 4/1995 |
| JP | 10-040936 | 2/1998 |
| JP | 11-003724 | 1/1999 |
| JP | 2003-317736 A | 11/2003 |
| JP | 2005-515602 A | 5/2005 |
| JP | 2005-149859 | 6/2005 |
| JP | 2007-42600 A | 2/2007 |
| JP | 2007-526598 A | 9/2007 |
| JP | 2008-77851 A | 4/2008 |
| JP | 2008-84592 A | 4/2008 |
| WO | 2005/104280 A1 | 11/2005 |

OTHER PUBLICATIONS

International Preliminary Report on Patentability issued on May 4, 2010 for corresponding JP/2008/067625.
Journal of the American Chemical Society, 2005, 127th Volume, No. 48, pp. 16758 to 16759.
International Search Report dated Dec. 16, 2008, for corresponding Patent Application PCT/JP2008/067625.
Japanese Patent Office, Notification of reasons for refusal issued in connection with Japanese Patent Application No. 2007-258400, dated Jun. 26, 2012. (4 pages).

*Primary Examiner* — Edward Johnson
(74) *Attorney, Agent, or Firm* — K&L Gates LLP

(57) ABSTRACT

A fuel cell includes a fuel electrode, an oxygen electrode, an electrolytic solution, a fuel flow passage, etc. The fuel electrode and the oxygen electrode are composed of a catalyst layer, a diffusion layer, and a collector, respectively. A methanol aqueous solution, etc. is continuously supplied to the fuel flow passage. Catalyst particulates consisting of platinum, ruthenium, palladium, etc. are in a dispersed state in the electrolytic solution. If a portion of fuel, such as methanol, passes through the fuel electrode as unreacted, and diffuses through the electrolytic solution to move to the oxygen electrode, oxidation reduction reactions between the methanol, and the oxygen which moves to the fuel electrode from the oxygen electrode are efficiently caused by the catalyst particulates so as to cancel each other. From the above are provided an electrolytic solution with high crossover blocking performance suitable for electrochemical devices, such as direct methanol fuel cells, and an electrochemical device using the electrolytic solution.

20 Claims, 6 Drawing Sheets

(a)

(b)

ELECTROLYTIC SOLUTION AND ELECTROCHEMICAL DEVICE

CROSS REFERENCE TO RELATED APPLICATIONS

The present application is a National Stage of International Application No. PCT/JP2008/067625 filed on Sep. 29, 2008 and which claims priority to Japanese Patent Application No. JP 2007-258400 filed on Oct. 2, 2007, the entire contents of which are being incorporated herein by reference.

BACKGROUND

The present disclosure relates to an electrolytic solution with high crossover blocking performance suitable for electrochemical devices, such as direct methanol fuel cells (DMFCs), and an electrochemical device using the electrolytic solution.

There are energy density and power density as indicators showing the characteristics of a cell. The energy density is the amount of storage of energy per unit mass of the cell, and the power density is the amount of output per unit mass of the cell. Since lithium ion secondary batteries have two features of a comparatively high energy density and a very high power density, and also have a high degree of completeness, the lithium ion secondary batteries are often adopted as a power source of mobile devices. However, in recent years, the power consumption of the mobile devices tends to increase along with high performance. Further improvements in the energy density and power density are also required in the lithium ion secondary batteries.

The solutions to the problem include changes in electrode materials which constitute a positive electrode and a negative electrode, an improvement in a coating method of the electrode materials, an improvement in an encapsulating method of the electrode materials, etc., and researches which improve the energy density of the lithium ion secondary batteries are being undertaken. However, hurdles against practical use are still high. Additionally, unless constituent materials used for current lithium ion secondary battery change, an improvement in large energy density cannot be expected.

For this reason, the development of cells with a higher energy density to replace the lithium ion secondary battery is urgently needed, and fuel cells are expected as one amongst strong candidates.

The fuel cells have a configuration in which an electrolyte is arranged between a fuel electrode (anode) and an oxygen electrode (cathode), fuel is supplied toward the fuel electrode, and air or oxygen is supplied toward the oxygen electrode. As a result, in the fuel electrode (anode) and cathode (oxygen electrode), an oxidation reduction reaction which is oxidized by oxygen is caused, a portion of the chemical energy of the fuel is converted into electrical energy, and is taken out.

Various kinds of fuel cells are already suggested or manufactured by way of trial, and some of the fuel cells are put into practical use. These fuel cells are classified into alkali electrolyte fuel cells (AFCs), phosphoric acid fuel cells (PAFCs), molten carbonate fuel cells (MCFCs), solid oxide fuel cells (SOFCs), proton exchange fuel cells (PEFCs), etc. according to electrolytes used. Among these, the proton exchange fuel cells (PEFCs) have an advantage that the fuel cells can be operated at low temperature, for example, a temperature of 30° C. to about 130° C., compared with fuel cells of other types.

Various combustible substances, such as hydrogen and methanol, can be used as fuels of the fuel cells. However, since cylinders, etc, for storage are needed, gaseous fuels, such as hydrogen, are not suitable for miniaturization. On the other hand, liquid fuels, such as methanol, have an advantage that the fuels are easily stored. Especially, the direct methanol fuel cells (DMFCs) which directly supply methanol to and make it react with the fuel electrode have advantages such that a reformer for outputting hydrogen from fuel is not needed, a configuration becomes simple, and miniaturization is easy. Conventionally, many DMFCs are combined with PEFCs, and have been studied as one kind of PEFC.

In DMFCs, generally, methanol as fuel is supplied to the fuel electrode as a low-concentration or high-concentration aqueous solution, or pure methanol is supplied to the fuel electrode in a gas state. Then, the methanol is oxidized into carbon dioxide in a catalyst layer of the fuel electrode. The protons produced at this time move toward the oxygen electrode through an electrolyte membrane which separates the fuel electrode from the oxygen electrode, react with oxygen in the oxygen electrode to produce water. The reactions which occur in the fuel electrode, an oxygen electrode, and the whole DMFC are expressed with the following reaction formulas, respectively.

Fuel electrode: $CH_3OH+H_2O \rightarrow CO_2+6e^-+6H^+$

Oxygen electrode: $(3/2)O_2+6e^-+6H^+ \rightarrow 3H_2O$

Whole DMFC: $CH_3OH+(3/2)O_2 \rightarrow CO_2+2H_2O$

The energy density of methanol that is fuel for DMFCs is theoretically 4.8 kW/L, and is 10 or more times the energy density of general lithium ion secondary batteries. That is, fuel cells using methanol as fuel have a great possibility of surpassing the energy density of the lithium ion secondary batteries. From this point, DMFCs among various fuel cells have a highest possibility of being used as an energy source of mobile devices, electric motorcars, etc.

However, DMFCs have a problem in that the output voltage when electricity is being actually generated may decrease to about 0.6 V or less even though the theoretical voltage is 1.23 V. One of the factors in the output voltage decrease is a voltage drop caused by the internal resistances of DMFCs. Internal resistances, such as resistance accompanying reactions caused in both electrodes, resistance accompanying the movement of substances, resistance caused when protons move through an electrolyte membrane, and contact resistance, exist inside DMFCs. Since the energy which can actually be output from oxidation of methanol as electrical energy is expressed by the product of an output voltage during power generation, and the quantity of electricity which flows through a circuit, when the output voltage during power generation decreases, the energy which can actually be output becomes small by that much. In addition, the quantity of electricity which can be output to the circuit by the oxidation of methanol is proportional to the amount of methanol in DMFCs, if the whole quantity of methanol is oxidized in the fuel electrode according to the above reaction formula.

Additionally, DMFCs have a problem of methanol crossover. The crossover is a phenomenon in which a reactant in one electrode (for example, fuel electrode) passes through an electrolyte membrane or an electrolytic solution, and reaches the other electrode (for example, oxygen electrode). The methanol crossover occurs according to two mechanisms including a phenomenon in which methanol diffuses and moves due to the concentration difference of methanol on the side of the fuel electrode and on the side of the oxygen electrode, and an electroosmotic phenomenon in which hydrated methanol is carried by the movement of water caused along with the movement of protons.

When the methanol crossover occurs, transmitted methanol is oxidized by a catalyst layer of the oxygen electrode. Although a methanol oxidation reaction on the side of the oxygen electrode is the same as an oxidation reaction on the side of the fuel electrode mentioned above, this becomes the cause of reducing the output voltage of DMFCs (for example, refer to "Description, Fuel Cell System", Ohmsha, Ltd., pp. 66). Additionally, since methanol is not used for power generation on the side of the fuel electrode but is wasted on the side of the oxygen electrode, the quantity of electricity which can be output to the circuit decreases by that much. Additionally, since a catalyst on the side of the oxygen electrode is not a platinum-ruthenium (Pt—Ru) alloy catalyst but a platinum (Pt) catalyst, there is a disadvantage that carbon monoxide (CO) is adsorbed on the surface of the catalyst, and poisoning of the catalyst occurs.

As described above, DMFC has two problems including a voltage drop caused by the internal resistance and the methanol crossover and the waste of fuel caused by the methanol crossover, and these problems become factors which reduce the power generation efficiency of DMFCs. Thus, in order to increase the power generation efficiency of DMFCs, the research and development which improve the characteristics of materials which constitute DMFCs, and the research and development which optimize the operating conditions of DMFCs are energetically undertaken.

The research which improves the characteristics of materials which constitute DMFCs includes researches on an electrolyte membrane, a catalyst on the side of a fuel electrode, etc. Currently, a poly perfluoro alkyl sulfonic acid-based resin layer (for example, Nafion by E. I. du Pont de Nemours & Co. (registered trademark)) is generally used as the electrolyte membrane. However, as materials having higher proton conductivity and higher methanol loss crossover blocking performance than this resin layer, fluorine-based polymer membranes, hydrocarbon-based polymer electrolyte membranes, or hydro gel base electrolyte membranes are presently being studied. As for the catalyst on the side of the fuel electrode, research and development is being undertaken of the catalyst with higher activity than a platinum-ruthenium (Pt—Ru) alloy catalyst which is generally being used now.

Such an improvement in characteristics of constituent materials of the fuel cells is appropriate as a means for improving the power generation efficiency of the fuel cells. However, in the current situation, optimal electrolyte membranes and optimal catalysts that can solve the two problems of DMFCs mentioned above have not yet been discovered.

Thus, in Journal of the American Chemical Society, 2005, 127th volume, No. 48, pp. 16758 to 16759 (FIG. 1), and in US Patent Application Publication No. 2004-0072047 (4th and 5th pages, FIG. 7), laminar flow (streamline flow) fuel cells which do not use an electrolyte membrane are suggested. In the laminar flow fuel cells, problems such as flooding in an oxygen electrode, moisture management and crossover of fuel, are solved.

In the laminar flow fuel cells, a fuel electrode and the oxygen electrode are arranged at wall surfaces with micro flow passages, and an electrolytic solution flows through the micro flow passages. As the electrolytic solution, a liquid consisting of a fuel and an electrolytic solution are used on the side in contact with the fuel electrode, and a liquid consisting of an electrolytic solution including oxygen is used on the side in contact with the oxygen electrode. In addition, the oxygen electrode is porous, and if oxygen is supplied through the oxygen electrode from the surface of the oxygen electrode opposite to the micro flow passages, the electrolytic solution which flows in contact with the oxygen electrode does not need to include oxygen.

The two kinds of liquids mentioned above flow forming a laminar flow, and an interface is formed at the boundary between the two kinds of liquids. As a result, the two kinds of liquids are adapted so as not to be suddenly mixed together by the motion of a fluid at macroscopic scales. In the laminar flow fuel cells, continuous power generation is possible, as such two (or more) kinds of liquids form a laminar flow and circulate without being mixed together. Although the interface is formed at the boundary between the two kinds of liquids, since molecules and ions can pass through the interface freely by a micro diffusion motion, electrochemical connection between the two kinds of liquids is maintained.

As described above, since an electrolyte membrane is not used in the laminar flow fuel cells, the problems caused by the proton-exchange fuel cell (PEFC) using an electrolyte membrane, for example, the problems of the electrolyte membrane deteriorating due to secular change, proton conductivity decreasing due to drying (lack of moisture) of the electrolyte membrane caused by a temperature rise, and power generation efficiency decreasing, do not exist.

In addition, the conditions under which the flow of the electrolytic solution becomes a laminar flow include a case in which the Reynolds number is small. The Reynolds number is a ratio between inertial force and viscous force, and is defined by the following Expression (1). Generally, if the Reynolds number is less than 2000, flow becomes a laminar flow.

$$\text{Reynolds number} = (\text{Inertial force}/\text{Viscous force}) = \rho UL/\mu = UL/\nu \qquad \text{Expression (1)}$$

In the above Expression, $\rho$ is the density of a fluid, U is characteristic velocity, L is characteristic length, $\mu$ is a viscosity coefficient, and $\nu$ is kinematic viscosity.

Since an electrolyte membrane is not used in the laminar flow fuel cells shown in Journal of the American Chemical Society, 2005, 127th volume, No. 48, pp. 16758 to 16759 (FIG. 1), and in US Patent Application Publication No. 2004-0072047 (4th and 5th pages, FIG. 7), a problem resulting from the electrolyte membrane is not caused. Additionally, the flooding, etc. in the oxygen electrode etc. is solved.

However, in the laminar flow fuel cells configured as the direct methanol fuel cells (DMFCs), the interface is formed at the boundary between the two kinds of liquids. However, a wall which divides both the liquids does not exist. Thus, due to the concentration difference between methanol on the side of the fuel electrode and methanol on the side of the oxygen electrode, a portion of methanol diffuses and moves through the interface from the fuel electrode to the oxygen electrode, and methanol crossover occurs. Although the methanol crossover occurs regardless of the degree of fuel concentration, especially when a high-concentration methanol aqueous solution is used as fuel, the influence of the methanol crossover appears prominently due to a large concentration difference. This is the same even in a case where the two kinds of liquids are locally divided by a separator. For example, in Journal of the American Chemical Society, 2005, 127th volume, No. 48, pp. 16758 to 16759 (FIG. 1), an example is reported in which the flow of the two kinds of liquids is a laminar flow, the influence of the crossover appears reliably in a methanol concentration of about 8 mols in spite of putting the separator between electrodes, and power generation characteristics degrade.

Additionally, as described with reference to FIG. 5 in Embodiment 3 which will be described later, the amount of methanol crossover can be significantly reduced compared with DMFC suggested in Journal of the American Chemical Society, 2005, 127th volume, No. 48, pp. 16758 to 16759 (FIG. 1) by completely separating the liquid flow consisting of a fuel and an electrolytic solution, and the flow of the liquid consisting only of an electrolytic solution. However, even if fuel supply speed and fuel concentration are controlled as long as the electrolytic solution which can dissolve methanol between the fuel electrode and the oxygen electrode is arranged, it is impossible to eliminate the methanol crossover completely. Additionally, in a fuel cell which generates electricity by circulating an electrolytic solution, crossovered methanol is accumulated and increases with power generation time even if the amount of methanol crossover generated per unit time is little. Thus, it goes without saying that the methanol crossover becomes a problem.

SUMMARY

An object is to provide an electrolytic solution with high crossover block performance suitable for electrochemical devices, such as direct methanol fuel cells (DMFCs), and an electrochemical device using the electrolytic solution.

An embodiment relates to an electrolytic solution arranged between a first electrode and a second electrode of an electrochemical device adapted so that the first electrode and the second electrode are arranged to face each other, a first reactant supplied toward the first electrode, and a second reactant supplied toward the second electrode perform oxidation reduction reactions via the first electrode and the second electrode. Here, catalyst particulates are contained in a dispersed state, and a first reactant which does not react on the first electrode and diffuses through the electrolytic solution to move to the second electrode, and a second reactant which does not react on the second electrode and diffuses through the electrolytic solution to move to the first electrode are adapted so that reactions that cancel each other by the oxidation reduction reactions are promoted by the catalyst particulates.

Additionally, an embodiment relates to an electrochemical device in which the electrolytic solution is arranged between the first electrode and the second electrode which face each other.

The electrolytic solution of the embodiment is an electrolytic solution used for an electrochemical device adapted so that the first electrode and the second electrode are arranged to face each other, a first reactant supplied toward the first electrode, and a second reactant supplied toward the second electrode perform oxidation reduction reactions via the first electrode and the second electrode. In this electrochemical device, if the first reactant and the second reactant react on the first electrode and the second electrode, respectively, in whole amounts, the best performance is exhibited. On the contrary, as the amount of crossover of the first reactant which does not react on the first electrode, and diffuses through the electrolytic solution to reach the second electrode and/or the amount of crossover of the second reactant which does not react on the second electrode, and diffuses through the electrolytic solution to reach the first electrode are larger, the performance of the electrochemical device degrades.

In the electrolytic solution of the embodiment, catalyst particulates are contained in a dispersed state, and the first reactant which does not react on the first electrode and diffuses through the electrolytic solution to move to the second electrode, and the second reactant which does not react on the second electrode and diffuses through the electrolytic solution to move to the first electrode are adapted so that reactions that cancel each other by oxidation reduction reactions are promoted by the catalyst particulates. Thus, the first reactant which reaches the second electrode and the second reactant which reaches the first electrode can be reduced, and the performance degradation of the electrochemical device caused by the crossover can be suppressed.

Since the electrolytic solution of the embodiment described above is arranged between the first electrode and second electrode which face each other, the electrochemical device of the embodiment can acquire the same effect as the above effects.

Additional features and advantages are described herein, and will be apparent from, the following Detailed Description and the figures.

DETAILED DESCRIPTION

Figure 1:
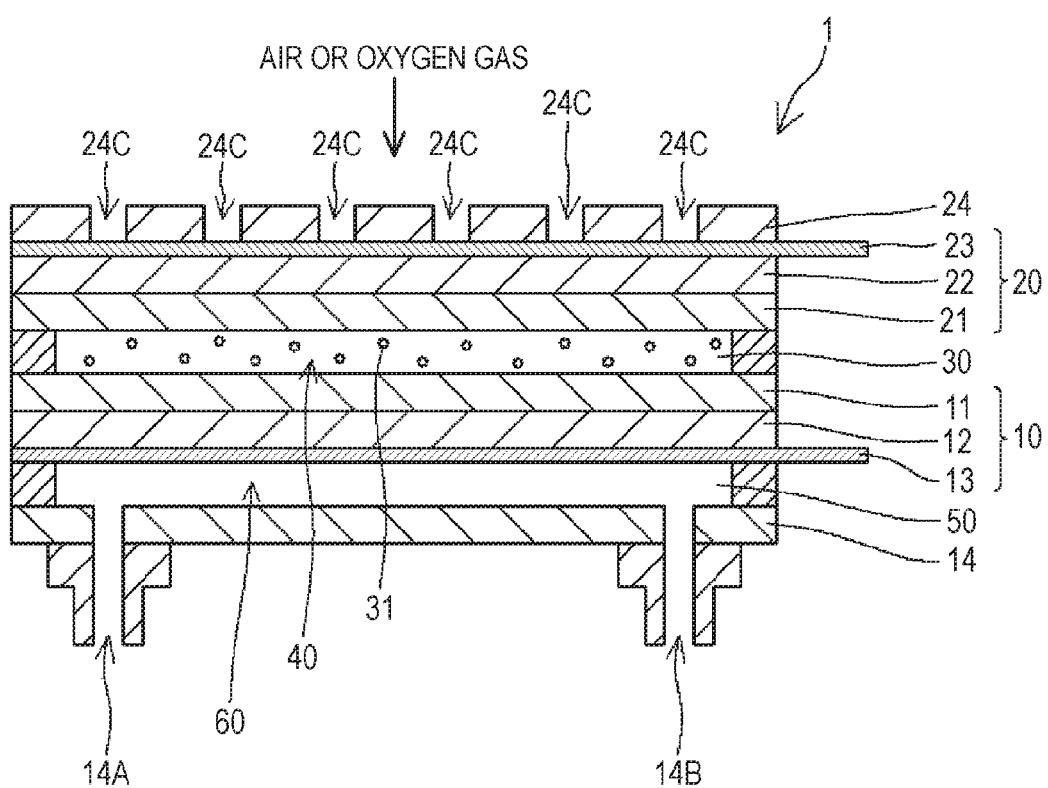
FIG. 1 is a sectional view showing the structure of a fuel cell based on Embodiment 1.

In an electrolytic solution of the embodiment, it is preferable that the particle diameter of catalyst particulates be 100 nm or less. If the particle diameter is larger than 100 nm, the efficiency as a catalyst decreases.

Additionally, the catalyst particulates may be catalysts which promote oxidation reduction reactions between the first reactant and the second reactant. Although not particularly limited, the catalyst particulates may be, for example, simple substances or alloys including at least one kind among platinum (Pt), ruthenium (Ru), palladium (Pd), and gold (Au). Platinum, ruthenium, and palladium are metals which have excellent oxidation-reduction catalyst performance, and gold is a metal about which the characteristics of particulates are well researched.

Additionally, the first reactant is hydrogen or alcohols, and it is preferable that the second reactant be oxygen. These are reactants which constitute the fuel cell, etc.

Additionally, it is preferable that the electrolytic solution of the embodiment be an acidic electrolytic solution. In this case, it is preferable that the electrolyte be at least one kind among an inorganic acid, an organic acid, or hydrogen ion dissociative solid particulates. The hydrogen ion dissociative solid particulates are solid particulates which can be dissociated in a state where the particulates are dispersed in a polar solvent, such as water, and can produce hydrogen ions in the solvent. Specifically, it is preferable that the inorganic acid be a sulfuric acid, the organic acid be a sulfonic acid-based organic compound, and the hydrogen ion dissociative solid particulates be sulfonic acid-based cation-exchange-resin particulates.

Since the sulfuric acid or the sulfonic acid-based organic compound is a strong acid and is able to form an electrolytic solution with high hydrogen ion concentration, the conductivity of an electrolytic solution can be increased, and electrochemical devices having excellent electrical properties can be configured. Since the sulfonic acid-based cation-exchange-resin particulates also have a sulfonic acid group with similarly strong acidity, the particulates can give high ionic conductivity to an electrolytic solution in spite of being a dispersion liquid. It cannot be said that the sulfuric acid which has conventionally been used as an electrolyte has sufficient safety since moisture may evaporate, and the sulfuric acid may be turned into a concentrated sulfuric acid and corrode surrounding members if the sulfuric acid has leaked even if an electrolytic solution is a dilute sulfuric acid. In contrast, as for the hydrogen ion dissociative solid particulates, such as sulfonic acid-based cation-exchange-resin particulates, even in a case where a dispersion medium has evaporated due to an environmental change, the hydrogen ion dissociative solid particulates only remain in a solid state, have no possibility of corroding surrounding members, and are able to increase safety. Thus, the hydrogen ion dissociative solid particulates are suitable as an electrolyte of electrochemical devices, such as a fuel cell.

Otherwise, it is preferable that at least a portion of the organic acid, such as a sulfonic acid-based organic compound, be adsorbed on the surface of the catalyst particulates. In such a case, similarly to a case where the hydrogen ion dissociative solid particulates are dispersed, even in a case where a dispersion medium has evaporated due to an environmental change, the catalyst particulates on which the organic acid is adsorbed only remain in a solid state, have no possibility of corroding surrounding members, and are able to increase safety. Thus, the hydrogen ion dissociative solid particulates are suitable as an electrolyte of electrochemical devices, such as a fuel cell.

Additionally, it is preferable that the electrolytic solution of the embodiment be a basic electrolytic solution. In this case, it is preferable that the electrolyte be at least one kind among an inorganic base, an organic base, or hydroxide ion dissociative solid particulates. The hydroxide ion dissociative solid particulates are solid particulates which can be dissociated in a state where the particulates are dispersed in a polar solvent, such as water, and can produce hydroxide ions in the solvent. Specifically, it is preferable that the electrolyte be at least one kind among hydroxide of an alkali metal, a quaternary ammonium compound, or quaternary ammonium compound-based anion exchange particulates.

Since the hydroxide of an alkali metal or the quaternary ammonium compound is a strong base and is able to form an electrolytic solution with high hydroxide ion concentration, the conductivity of an electrolytic solution can be increased, and the electrochemical devices having excellent electrical properties can be configured. Since the quaternary ammonium compound-based anion exchange particulates also have a quaternary ammonium compound with similarly strong basicity, the particulates can give high ionic conductivity to an electrolytic solution in spite of being a dispersion liquid. In contrast, as for the hydroxide ion dissociative solid particulates, such as quaternary ammonium compound-based anion exchange particulates, even in a case where a dispersion medium has evaporated due to an environmental change, the hydroxide ion dissociative solid particulates only remain in a solid state, have no possibility of corroding surrounding members, and are able to increase safety. Thus, the hydroxide ion dissociative solid particulates are suitable as an electrolyte of electrochemical devices, such as a fuel cell.

Otherwise, it is preferable that at least a portion of the organic base, such as a quaternary ammonium compound, be adsorbed on the surface of the catalyst particulates. In such a case, similarly to a case where the hydroxide ion dissociative solid particulates are dispersed, even in a case where a dispersion medium has evaporated due to an environmental change, the catalyst particulates on which the organic base are adsorbed only remain in a solid state, have no possibility of corroding surrounding members, and are able to increase safety. Thus, the hydroxide ion dissociative solid particulates are suitable as an electrolyte of electrochemical devices, such as a fuel cell.

Additionally, it is preferable that the electrochemical device be a fuel cell, and particularly, it is preferable that the electrochemical device be configured as a fuel cell which uses methanol or hydrogen as fuel. Here, the invention is not limited to this. For example, the electrochemical device may be configured as a sensor which detects combustible substances.

In the electrochemical device of the embodiment, it is preferable that a gas liquid separation film be provided on the surface of the first electrode facing a supply passage of the first reactant. By doing so, the first reactant can be supplied to the supply passage in a liquid or solution state, and the first reactant can be turned into a gas state in the gas liquid separation film, and can be supplied to the surface of the first electrode in a gas state.

Additionally, it is preferable to configure the electrochemical device so that the electrolytic solution flows between the first electrode and the second electrode. In this case, it is preferable that the flow of the electrolytic solution be a laminar flow. By doing so, the first reactant which does not react on the first electrode, and diffuses through the electrolytic solution to move to the second electrode, and the second reactant which does not react on the second electrode, and diffuses through the electrolytic solution to move to the first electrode can be washed away before reaching the counter electrodes, respectively, and the performance degradation of the electrochemical device caused by crossover can be suppressed.

In this case, it is preferable to configure the electrochemical device so that an electrolytic solution which has finished flowing between the first electrode and the second electrode is reused. As the electrolytic solution is circulated and reused in this way, the electrochemical device is able to operate continuously for a long time at low cost. In this case, it is preferable to provide a means which removes the first reactant and/or the second reactant from the electrolytic solution which has finished flowing, prior to the reuse. Since the first reactant and/or the second reactant are more or less included in the electrolytic solution which has finished flowing, it is preferable to provide any arbitrary means which separates and removes such reactants so that such reactants do not continue to be accumulated. Although a means which separates methanol is not particularly limited, a means which separates and removes the methanol by a separation membrane, or a means which removes methanol, by evaporation, adsorption, solvent extraction, or reactions, such as oxidation, may be used.

Additionally, it is preferable to configure the electrochemical device as a fuel cell. These are as described above.

Hereinafter, embodiments will be described in detail with reference to the drawings.

Embodiment 1

In Embodiment 1, an example of an electrolytic solution set forth in claims 1 to 8, and examples of electrochemical devices set forth in claims 14 and 15, which are configured as direct methanol fuel cells (DMFCs) using the electrolytic solution, will be described.

<Configuration of Fuel Cell 1>

FIG. 1 is a sectional view showing the structure of the fuel cell 1 based on Embodiment 1. The fuel cell 1 mainly includes a fuel electrode (anode) 10 and an oxygen electrode (cathode) 20 which are arranged to face each other, an electrolytic solution 30, an electrolytic solution chamber 40, and a fuel flow passage 60, and is configured as a DMFC.

The fuel electrode 10 has a configuration in which a catalyst layer 11, a diffusion layer 12, and a collector 13 are laminated sequentially from the oxygen electrode 20 side, and is housed in an outer packaging member 14. A fuel flow passage 60 which circulates a fuel-containing fluid 50 including methanol that is the first reactant is provided on the outside of the fuel electrode 10, i.e., on the side opposite to the oxygen electrode 20. As the first reactant, other alcohol, such as ethanol, hydrogen, etc., can also be used instead of methanol.

The oxygen electrode 20 has a configuration in which a catalyst layer 21, a diffusion layer 22, and a collector 23 are laminated sequentially from the fuel electrode 10 side, and is housed in an outer packaging member 24. The outer packaging member 24 is formed with pores 24C and the oxygen that is the second reactant is supplied to the oxygen electrode 20 through the pores 24C as air or oxygen gas.

The catalyst layers 11 and 21 contain, for example, a catalyst made of metal simple substances or alloys, such as palladium (Pd), platinum (Pt), iridium (Ir), rhodium (Rh), and ruthenium (Ru). Additionally, in addition to the catalyst, a proton conductor and a binder may be included in the catalyst layers 11 and 21. Although the proton conductor includes, poly perfluoro alkyl sulfonic acid-based resin (for example, Nafion by E. I. du Pont de Nemours & Co. (registered trademark)), etc., other proton-conductive resins may be used. The binder is one added in order to maintain the strength and pliability of the catalyst layers 11 and 21, and the material of the binder includes, for example, resins, such as polytetrafluoroethylene (PTFE) and polyvinylidene fluoride (PVDF).

The diffusion layers 12 and 22 include, for example, a carbon cross, carbon paper, or a carbon sheet. It is desirable that the diffusion layers 12 and 22 are subjected to hydrophobic processing by polytetrafluoroethylene (PTFE), etc.

The collectors 13 and 23 include, for example, a net made of titanium (Ti).

Although the outer packaging members 14 and 24 are made of materials, such as a titanium plate with a thickness of 2.0 mm, which can be easily purchased, the materials are not particularly limited. In addition, it is desirable that the thickness of the outer packaging members 14 and 24 is smaller.

The electrolytic solution chamber 40 is, for example, one which is obtained by working on a resin sheet, thereby forming the space which contains the electrolytic solution 30, and the resin sheet is bonded and fixed to the fuel electrode 10. Additionally, the fuel flow passage 60 is, for example, one which is obtained by performing working on the resin sheet, thereby forming a fine grooved flow passage, and the resin sheet is bonded and fixed to the fuel electrode 10. The number of flow passages is not limited. Additionally, although the width, height, and length of the flow passage are not particularly limited, smaller ones are desirable.

The fuel flow passage 60 is connected to a fuel supply unit (not shown) via a fuel inlet 14A and a fuel outlet 14B which are provided in the outer packaging member 14, and the fuel-containing fluid 50 including methanol is continuously supplied from the fuel supply unit.

In the electrolytic solution 30 based on Embodiment 1, catalyst particulates 31 are contained in a dispersed state. It is preferable that the electrolytic solution 30 be an acidic electrolytic solution. If the first reactant is hydrogen, the electrolytic solution 30 may have basicity. However, if the first reactant is a carbon-containing substance, such as methanol, the electrolytic solution 30 needs to have acidity so as not to react with carbon dioxide that is an electrode reaction product.

The solvent of the electrolytic solution 30 is a polar solvent, such as water, and the electrolyte thereof is at least one kind among an inorganic acid, an organic acid, or hydrogen ion dissociative solid particulates. Specifically, the inorganic acid is a sulfuric acid, etc., the organic acid is a sulfonic acid-based organic compound, etc., and the hydrogen ion dissociative solid particulates are sulfonic acid-based cation-exchange-resin particulates, etc.

Since the sulfuric acid or the sulfonic acid-based organic compound is a strong acid and is able to form an electrolytic solution with high hydrogen ion concentration, the conductivity of an electrolytic solution can be increased, and electrochemical devices having excellent electrical properties can be configured. Since the sulfonic acid-based cation-exchange-resin particulates also have a sulfonic acid group of similarly strong acidity, the particulates can give high ionic conductivity to an electrolyte in spite of being dispersion liquid.

It cannot be said that the sulfuric acid which has conventionally been used as an electrolyte has sufficient safety since moisture may evaporate, and the sulfuric acid may be turned into a concentrated sulfuric acid and corrode surrounding members if the sulfuric acid has leaked even if an electrolytic solution is a dilute sulfuric acid. In contrast, as for the hydrogen ion dissociative solid particulates, such as sulfonic acid-based cation-exchange-resin particulates, even in a case where a dispersion medium has evaporated due to an environmental change, the hydrogen ion dissociative solid particulates only remain in a solid state, have little possibility of corroding surrounding members, and are able to increase safety. Thus, the hydrogen ion dissociative solid particulates are suitable as an electrolyte of electrochemical devices, such as a fuel cell. Additionally, recovery and reuse of the hydrogen ion dissociative solid particulates are also easy.

The catalyst particulates 31 may be catalysts which promote oxidation reduction reactions between fuel substances such as methanol, and oxygen. Although not particularly limited, the catalyst particulates may be simple substances or alloys including at least one kind among platinum (Pt), ruthenium (Ru), palladium (Pd), and gold (Au). Platinum, ruthenium, and palladium are metals which have excellent oxidation-reduction catalyst performance, and gold is a metal about which the characteristics of particulates are well researched. The platinum-based metals include, for example, platinum (Pt), platinum-ruthenium (Pt—Ru), platinum-gold (Pt—Au), platinum-cobalt (Pt—Co), platinum-nickel (Pt—Ni), platinum-molybdenum (Pt—Mo), platinum-iridium (Pt—Ir), platinum-palladium (Pt—Pd), platinum-titanium (Pt—Ti), etc. Additionally, the platinum-based metals may include ternary, quaternary, or more platinum-based metals as well as binary platinum-based metals.

Additionally, the particle diameter of the catalyst particulates 31 is not particularly limited. It is because various systems exist, such as systems where activity decreases or increases as particle diameter becomes larger, where activity reaches the maximum as in certain grain systems, and where activity does not depend on particle diameter. However, generally, a reactant is adsorbed on reaction sites on the surfaces of catalyst particulates and reaction proceeds there. Thus, as the surface area of catalyst particulates is larger, the activity of a catalyst of a fuel cell becomes higher. Additionally, the surface area per unit mass becomes larger as particle diameter is smaller. Accordingly, in many cases, it is known that, as the particle diameter of a catalyst is smaller, the activity of the catalyst become higher. Here, it is preferable that the particle diameter of the catalyst particulates 31 be sub-nanometer or less, for example, 100 nm or less.

<Operation of Fuel Cell 1>

In the fuel cell 1, for example, an aqueous solution including methanol at low concentration or high concentration is continuously supplied to the fuel flow passage 60 as the fuel-containing fluid 50. In this state, power generation is performed when the fuel electrode 10 and the oxygen electrode 20 are electrically connected to each other via an external circuit (not shown). In this case, methanol is oxidized into carbon dioxide in the catalyst layer 11 of the fuel electrode 10 to produce electrons and protons. The electrons produced at this time are delivered to the external circuit, and the protons diffuse and move through the electrolytic solution 30 which separates the fuel electrode 10 from the oxygen electrode 20, and are moved toward the oxygen electrode 20. The protons react with oxygen on the oxygen electrode 20 and the electrons introduced from the external circuit, thereby producing water. The reactions which occur in the fuel electrode 10, the oxygen electrode 20, and the whole fuel cell 1 are expressed by the following reaction formulas, respectively.

Fuel electrode: $CH_3OH + H_2O \rightarrow CO_2 + 6e^- + 6H^+$

Oxygen electrode: $(3/2)O_2 + 6e^- + 6H^+ \rightarrow 3H_2O$

Whole DMFC: $CH_3OH + (3/2)O_2 \rightarrow CO_2 + 2H_2O$

In this way, a portion of chemical energy of fuel, such as methanol, is converted into electrical energy, an electric current is produced from the fuel cell 1, and the external circuit is driven. The carbon dioxide generated in the fuel electrode 10 flows and is removed along with the fuel-containing fluid 50, and the water generated in the oxygen electrode 20 flows and is removed along with air or oxygen gas.

Most of the fuel, such as methanol which has entered the pores in the fuel electrode 10 from the fuel flow passage 60, reacts by the electrode reaction, while passing through the fuel electrode 10. If a portion of the fuel passes through the fuel electrode 10 as unreacted, and diffuses through the electrolytic solution 30 to move to the oxygen electrode 20, the catalyst particulates 31 are dispersed in the electrolytic solution 30 in the fuel cell 1. Therefore, the oxidation reduction reactions between the methanol, and the oxygen which diffuses through the electrolytic solution 30 from the oxygen electrode 20 to move to the fuel electrode 10 can be efficiently caused so as to cancel each other. This makes it possible to reduce the amount of the methanol which diffuses and moves through the electrolytic solution 30 from the fuel electrode 10, and reaches the oxygen electrode 20, and to suppress the performance degradation of the fuel cell 1 caused by the methanol crossover. As a result, it is possible to utilize a high-concentration methanol solution as the fuel-containing fluid 50, and the high energy density characteristics that are the inherent features of DMFCs are realized.

Since the fuel cell 1 does not include an electrolyte membrane as a constituent member, the problems caused as the proton-exchange fuel cell (PEFC) uses an electrolyte membrane, for example, the problems of the electrolyte membrane deteriorating due to a secular change, proton conductivity decreasing due to drying (lack of moisture) of the electrolyte membrane caused by a temperature rise, and power generation efficiency decreasing, do not exist. For this reason, stable power generation is performed, without being greatly influenced by temperature and humidity. Additionally, although the electrolyte membrane has a limit to the improvement in proton conductivity, much greater proton conductivity than this conductivity can be easily realized in the electrolytic solution. Moreover, problems in the oxygen electrode, such as flooding and moisture management, can also be solved.

In the literature, it is reported that blocking of the methanol crossover and self-humidification are possible by making a platinum catalyst contained in a solid electrolyte membrane (refer to Journal of Power Sources, 2007, 165th volume, and pp. 733 to 738, and Journal of Power Sources, 2007, 165th volume, pp. 786 to 792). However, in these examples, since the electrolyte membrane is a solid electrolyte membrane, it is necessary to add a resin having ion conductivity (proton conductivity), and a carrier for fixing platinum nano particles, etc., or, depending on conditions, a binder for maintaining the strength of the membrane. For this reason, since the degree of freedom is low, the ion conductivity also becomes low compared with an electrolytic solution which is binder-free, and it is very difficult to contain metal nano particles, etc., and maintain high ionic conductivity, thus there is a problem in that content is also limited.

<Making of Fuel Cell 1>

The fuel cell 1, for example, can be manufactured as follows.

First, for example, an alloy particulate catalyst including platinum (Pt) and ruthenium (Ru) in a predetermined ratio, and dispersion liquid of poly perfluoro alkyl sulfonic acid-based resin (for example, Nafion by E. I. du Pont de Nemours & Co. (registered trademark)) are mixed together in a predetermined ratio, and this mixed liquid is arranged using application methods, such as spray coating and spin coating, or printing methods, such as screen printing, whereby the catalyst layer 11 of the fuel electrode 10 is formed. This catalyst layer 11 is thermo-compressed against the diffusion layer 12 made of a carbon cross, carbon paper, or a carbon sheet. Moreover, the collector 13 composed of a net, etc. made of titanium (Ti) is thermo-compressed against the diffusion layer 12 using a hot melt-based adhesive, or an adhesive resin sheet, whereby the fuel electrode 10 is formed.

Meanwhile, for example, a catalyst having platinum (Pt) carried in carbon, and a dispersed solution of poly perfluoro alkyl sulfonic acid-based resin (for example, Nafion by E. I. du Pont de Nemours & Co. (registered trademark)) are mixed together in a predetermined ratio, and this mixed liquid is arranged using application methods or printing methods, whereby the catalyst layer 21 of the oxygen electrode 20 is formed. The catalyst layer 21 is thermo-compressed against the diffusion layer 12 made of a carbon cross, carbon paper, or a carbon sheet. Moreover, the collector 23 composed of a net, etc. made of titanium (Ti) is thermo-compressed against the diffusion layer 22 using a hot melt-based adhesive, or an adhesive resin sheet, whereby the oxygen electrode 20 is formed.

Next, an adhesive resin sheet is prepared, a space which becomes the electrolytic solution chamber 40 is formed in this resin sheet, and the resin sheet is thermo-compressed against one side of the fuel electrode 10. Additionally, the same resin sheet is prepared, a flow passage is formed in this resin sheet to make the fuel flow passage 60, and the resin sheet is thermo-compressed against the opposite side of the fuel electrode 10.

Next, the outer packaging members 14 and 24 composed of a thin titanium plate, etc. are made, and the outer packaging member 14 is provided with, for example, the fuel inlet 14A and the fuel outlet 14B composed of a joint made of resin.

Next, the fuel electrode 10 and the oxygen electrode 20 are arranged to face each other so that the fuel flow passage 60 is located outside, and the electrolytic solution chamber 40 is sandwiched between the electrodes. Thereafter, these assemblies are housed in the outer packaging members 14 and 24. Thereby, the fuel cell 1 shown in FIG. 1 is completed.

Modification 1

Figure 2:
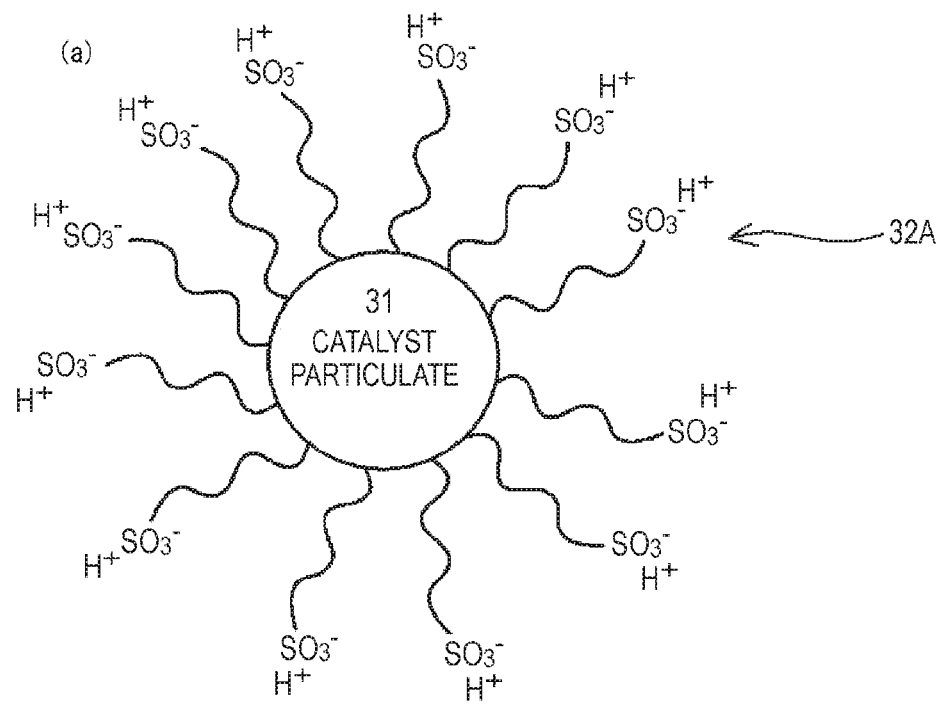
FIGS. 2(a) and 2(b) are schematic diagrams schematically showing the state of catalyst particulates in an electrolytic solution based on Modification 1.
Figure 2:
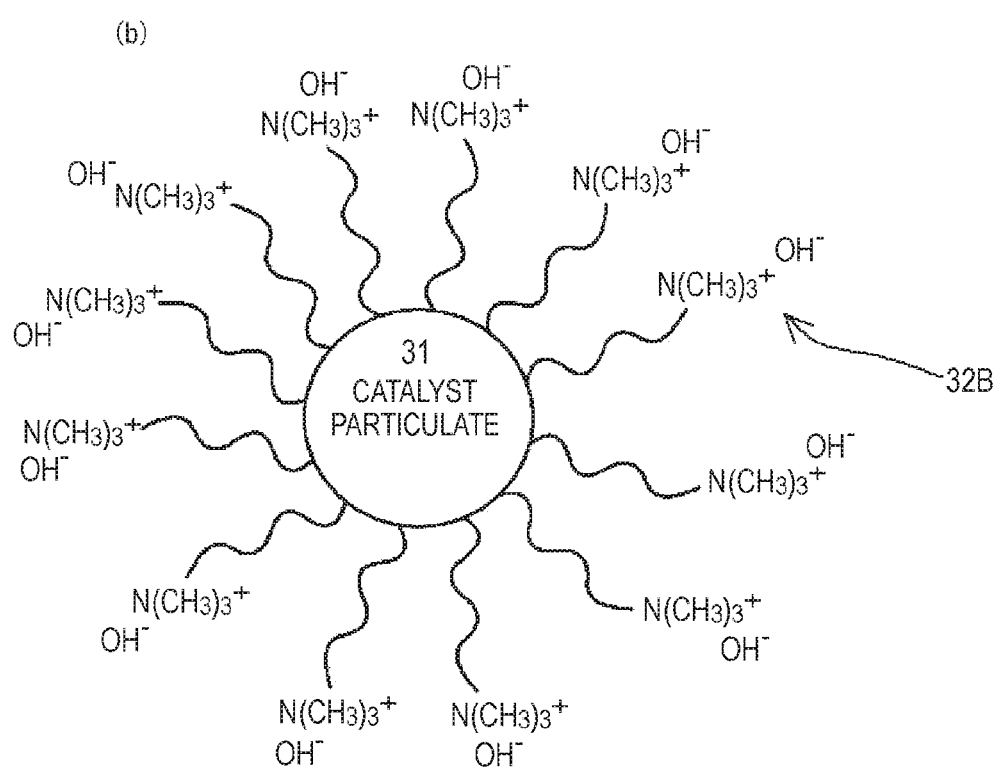

FIG. 2(*a*) is a schematic diagram schematically showing the state of catalyst particulates in an electrolytic solution based on Modification 1 of Embodiment 1. Modification 1 corresponds to claim 8 of the invention, and the catalyst particulates 31 in the electrolytic solution 30 based on Modification 1 are adapted so as to adsorb at least a portion of the organic acids 32A, such as a sulfonic acid-based organic compound, on the surfaces thereof.

In such a case, even in a case where a dispersion medium has evaporated due to an environmental change similarly to the hydrogen ion dissociative solid particulates, the catalyst particulates 31 on which the organic acid 32A is adsorbed only remain in a solid state. As a result, since the electrolytic solution according to Modification 1 can increase safety with little possibility of corroding surrounding members, this electrolytic solution is suitable as an electrolyte of electrochemical devices, such as a fuel cell. Additionally, recovery and reuse of the organic acid 32A on which the catalyst particulates 31 are adsorbed are easy.

Also, when compounds having a functional group of strong acidity, such as a sulfonic acid-based organic compound, are used as the organic acid 32A, the degree of electrolytic dissociation is large. Thus, even if all the organic acid 32A is adsorbed on the surfaces of the catalyst particulates 31, the compounds can form an electrolytic solution with high hydrogen ion concentration in spite of being a dispersion liquid, can increase the proton conductivity of the electrolytic solution, and can form a fuel cell with small internal resistance.

Additionally, as described in Embodiment 1, the catalyst particulates 31 can reduce the amount of the methanol which diffuses and moves through the electrolytic solution 30 from the fuel electrode 10, and reaches the oxygen electrode 20, and can suppress the performance degradation of the fuel cell 1 caused by the methanol crossover. As a result, it is possible to utilize a high-concentration methanol solution as the fuel-containing fluid 50, and the high energy density characteristics that are the inherent features of DMFCs are realized.

Since it is possible to make catalyst particulates having various functional molecules on the surfaces thereof, the material, etc. is not limited. For example, a method of making various platinum nano particles having functional molecules on the surfaces thereof is described in Langmuir, 2004, 20th volume, No. 14, and pp. 6012 to 6018. In this way, the method of making various nano particles having functional molecules adsorbed on the surfaces thereof is suggested, and it is contemplated that various devices to which these nano particles can be practically applied can be made.

Although the organic acid 32A used in Modification 1 is not particularly limited, it is required that groups which can be combined with the surfaces of the catalyst particulates 31 other than the acidic group are provided. The groups which can be combined with the surfaces of the catalyst particulates 31 include, isocyano group-NC, carboxyl group-COOH, phosphono group-$PO(OH)_2$, amino group-$NH_2$, etc.

Additionally, if the fuel is a fuel which does not contain carbon, such as hydrogen, a basic electrolytic solution can be used. In this case, as shown in FIG. 2(*b*), the organic base 32B, such as a quaternary ammonium compound having strong basic group-$N(CH_3)_3{}^+OH^-$, etc. as an electrolyte, can be used. Although the organic base 32B is not particularly limited, it is required that groups which can be combined with the surfaces of the catalyst particulates 31 other than the basic group is provided.

In order to make the electrolytic solution of Modification 1, the catalyst particulates 31 on which the organic acid 32A is adsorbed are mixed with a polar solvent, such as water. In this case, other acid electrolytes, etc. can be further added.

Modification 2

Figure 3:
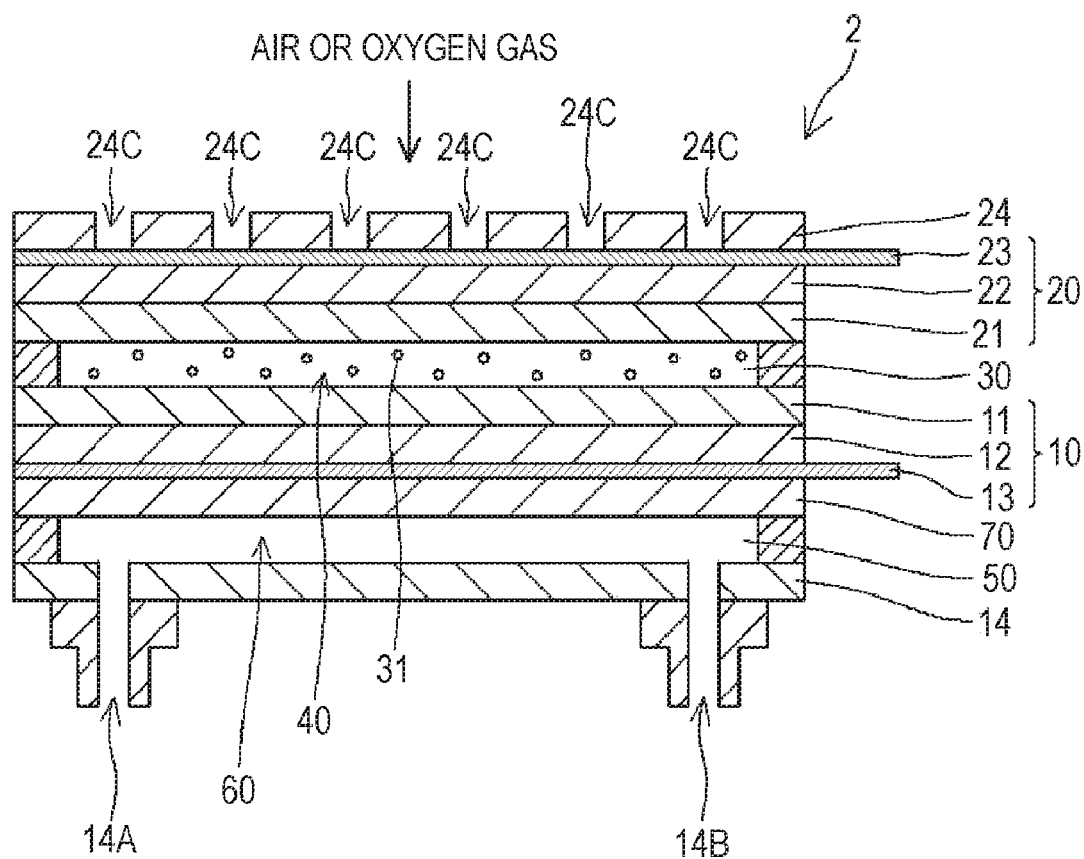
FIG. 3 is a sectional view showing the structure of a fuel cell based on Modification 2.

FIG. 3 is a sectional view showing the structure of the fuel cell 2 based on Modification 2 of Embodiment 1. Modification 2 corresponds to the electrochemical device set forth in claim 15. The fuel cell 2, similarly to the fuel cell 1, mainly includes a fuel electrode (anode) 10 and an oxygen electrode (cathode) 20 which are arranged to face each other, an electrolytic solution 30, an electrolytic solution chamber 40, and a fuel flow passage 60.

The fuel cell 2 is different from the fuel cell 1 in that a gas liquid separation film 70 is provided between the fuel flow passage 60 and the fuel electrode 10. In the fuel cell 2, similarly to the fuel cell 1, for example, an aqueous solution including methanol at low concentration or high concentration is supplied to the fuel flow passage 60 as the fuel-containing fluid 50. However, it is also possible to supply pure liquid methanol. Since the gas liquid separation film 70 is provided between the fuel flow passage 60 and the fuel electrode 10 in the fuel cell 2, the methanol supplied in a liquid or solution state evaporates while flowing through the fuel flow passage 60, passes through the gas liquid separation film 70 in a gas state from the surface in contact with the gas liquid separation film 70, and is supplied to the fuel electrode 10. For this reason, methanol is efficiently supplied to the fuel electrode 10 where a reaction is stably performed. Additionally, since fuel is supplied to the fuel electrode 10 in a gas state, and electrode reaction activity becomes high, high power generation performance is exhibited even in high-load electronic apparatuses, and the methanol crossover also hardly occurs.

Others are the same as the fuel cell 1, the catalyst particulates 31 can reduce the amount of the methanol which diffuses and moves through the electrolytic solution 30 from the fuel electrode 10, and reaches the oxygen electrode 20, and can suppress the performance degradation of the fuel cell 2 caused by the methanol crossover. Additionally, the fuel cell 2 can be manufactured similarly to the fuel cell 1 except for having a step of providing the gas liquid separation film 70 between the fuel flow passage 60 and the fuel electrode 10.

As described above, in Modification 2, the gas liquid separation film 70 is provided between the fuel flow passage 60 and the fuel electrode 10. Thus, methanol (methanol with a purity of 99.9% or more) which is substantially pure as the fuel-containing fluid 50 can be used, and high energy density characteristics that are the features of DMFCs are more effectively realized. Additionally, the stability of reactions and the electrode reaction activity can be increased, and the methanol crossover can be suppressed. As a result, high power generation performance can be exhibited even in high-load electronic apparatuses. Moreover, in the fuel supply unit, a concentration adjusting part which adjusts the methanol concentration of the fuel-containing fluid 50 can be omitted, and a fuel cell serving as a system including the fuel supply unit can be further miniaturized.

Embodiment 2

In Embodiment 2, examples of electrochemical devices set forth in claims 14 to 19 configured as direct methanol fuel cells (DMFCs) will be described.

<Configuration of Fuel Cell 110>

Figure 4:
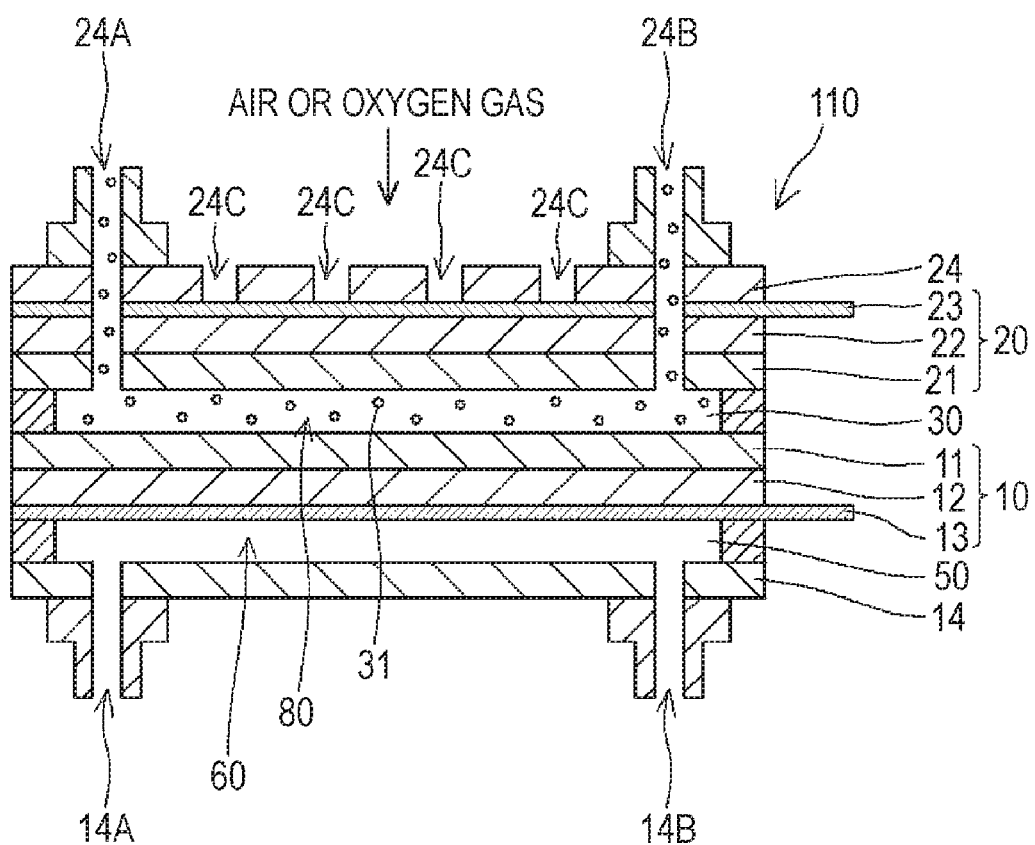
FIG. 4 is a sectional view showing the structure of a fuel cell based on Embodiment 2.

FIG. 4 is a sectional view showing the structure of the fuel cell 110 based on Embodiment 2. The fuel cell 110 mainly includes a fuel electrode (anode) 10 and an oxygen electrode (cathode) 20 which are arranged to face each other, an electrolytic solution 30, an electrolytic solution flow passage 80, and a fuel flow passage 60, and is configured as a DMFFC (Direct Methanol Flow Based Fuel Cell).

The fuel cell 110 is different from the fuel cell 1 in that an electrolytic solution flow passage 80 is provided instead of the electrolytic solution chamber 40. Additionally, the electrolytic solution flow passage 80 is, for example, one which is obtained by working on a resin sheet, thereby forming a fine grooved flow passage, and the resin sheet is bonded and fixed to the fuel electrode 10. In addition, the number of flow passages is not limited. Additionally, although the width, height, and length of the flow passage are not particularly limited, smaller ones are desirable. The electrolytic solution flow passage 80 is connected to an electrolytic solution supply unit 140 (refer to FIG. 5) (which is not shown in FIG. 4) via an electrolytic solution inlet 24A and an electrolytic solution outlet 24B which are provided in the outer packaging member 24. The fuel cell 110 is configured so that the electrolytic solution 30 is continuously supplied from the electrolytic solution supply unit 140, and the electrolytic solution 30 forms a laminar flow and flow between the fuel electrode 10 and the oxygen electrode 20.

Additionally, the fuel flow passage 60 is connected to a fuel supply unit 150 (refer to FIG. 5) via the fuel inlet 14A and the fuel outlet 14B (not shown in FIG. 4) which are provided in the outer packaging member 14, and the fuel-containing fluid 50 is continuously supplied from the fuel supply unit 150.

Figure 5:
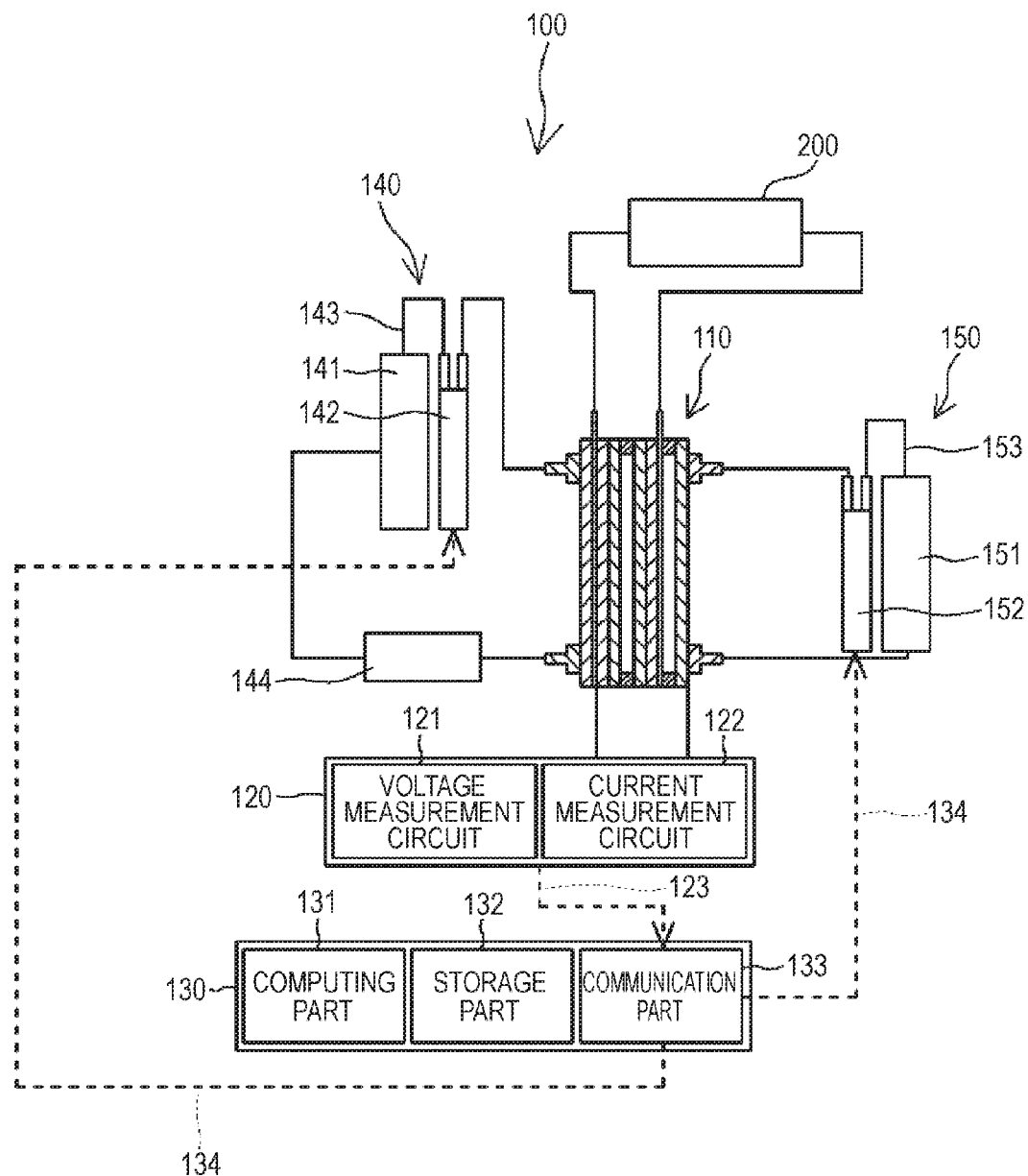
FIG. 5 is a schematic explanatory view showing the configuration of a fuel cell system 100.

FIG. 5 is a schematic explanatory view showing the configuration of a fuel cell system 100 based on Embodiment 2. The fuel cell system 100 includes the fuel cell 110, a measurement unit 120 which measures the operational status of the fuel cell 110, a control unit 130 which determines the operating conditions of the fuel cell 110 on the basis of the measurement results by the measurement unit 120, the electrolytic solution supply unit 140, and the fuel supply unit 150. As described above, the electrolytic solution supply unit 140 and the fuel supply unit 150 are connected to the electrolytic solution flow passages 80 and the fuel flow passage 60, respectively.

The electrolytic solution supply unit 140 includes an electrolytic solution storage part 141, an electrolytic solution supply adjusting part 142, an electrolytic solution supply line 143, and a separating chamber 144. The electrolytic solution storage part 141 is a member which stores the electrolytic solution 30, and includes, for example, a tank or a cartridge. The electrolytic solution supply adjusting part 142 is a member which adjusts the supply flow velocity of the electrolytic solution 30. The electrolytic solution supply adjusting part 142 is not particularly limited if the adjusting part is a member which can be driven by a signal from the control unit 130. However, it is preferable that the adjusting part include, for example, a valve driven by a motor, a piezoelectric element, an electromagnetic pump.

As shown in FIG. 5, it is preferable to configure the fuel cell system so that the electrolytic solution 30 which has finished flowing between the fuel electrode 10 and the oxygen electrode 20 is reused. As the electrolytic solution 30 is circulated and reused in this way, the fuel cell 110 is able to operate continuously for a long time at low cost. Here, fuels, such as a small amount of methanol, may be mixed in the electrolytic solution 30 which has come out of the electrolytic solution outlet 24B. Accordingly, a certain means which separates and removes the fuels from the electrolytic solution 30 which has finished flowing between the electrodes is required so that fuels, such as methanol, do not continue to be accumulated in the electrolytic solution 30. As a means thereto, a separating chamber 144 is provided near the electrolytic solution outlet 24B. Although the means which separates and removes methanol is not particularly limited, a means which removes the methanol by a separation membrane (filter), or a means which removes methanol by evaporation, adsorption, solvent extraction, or reactions, such as oxidation, may be used.

The fuel supply unit 150 has a fuel storage part 151, a fuel supply adjusting part 152, and a fuel supply line 153. The fuel storage part 151 is a member which stores the fuel-containing fluid 50, and includes, for example, a tank or a cartridge. The fuel supply adjusting part 152 is a member which adjusts the supply flow velocity and supply amount of the fuel-containing fluid 50. The fuel supply adjusting part 152 is not particularly limited if the adjusting part is a member which can be driven by a signal from the control unit 130. However, it is preferable that the adjusting part include, for example, a valve driven by a motor, a piezoelectric element, an electromagnetic pump. In addition, the fuel supply unit 150 may include a concentration adjusting part (not shown) which adjusts the methanol concentration of the fuel-containing fluid 50.

<Operation of Fuel Cell 110>

In the fuel cell 110, for example, an aqueous solution including methanol is continuously supplied to the fuel flow passage 60 as the fuel-containing fluid 50, and the electrolytic solution 30 containing the catalyst particulates 31 is continuously supplied to the electrolytic solution flow passages 80. In this state, power generation is performed when the fuel electrode 10 and the oxygen electrode 20 are electrically connected to each other via an external circuit 200. The external circuit 200 is, for example, a mobile device, such as a cellular phone and a PDA (Personal Digital Assistant; personal portable information device), or a notebook PC (Personal Computer) and is a power load driven by the electrical energy generated by the fuel cell system 100.

In this case, most of the fuel, such as methanol which has entered the pores in the fuel electrode 10 from the fuel flow passage 60, reacts by the electrode reaction already described in Embodiment 1, while passing through the fuel electrode 10. If a portion of the fuel passes through the fuel electrode 10 as unreacted, and diffuses through the electrolytic solution 30 to move to the oxygen electrode 20, the flow of the electrolytic solution 30 is formed between the fuel electrode 10 and the oxygen electrode 20 in the fuel cell 110. Thus, the methanol which diffuses through the electrolytic solution 30 from the fuel electrode 10 to move to the oxygen electrode 20 can be washed away from between the electrodes, before reaching the oxygen electrode 20, and the performance degradation of the fuel cell 110 caused by the methanol crossover can be noticeably suppressed.

Moreover, similarly to the fuel cell 1, in the fuel cell 110, the catalyst particulates 31 are dispersed in the electrolytic solution 30. Therefore, the oxidation reduction reactions between the methanol, and the oxygen which diffuses through the electrolytic solution 30 from the oxygen electrode 20 to move to the fuel electrode 10 can be efficiently caused so as to cancel each other. This makes it possible to reduce further the amount of the methanol which diffuses and moves through the electrolytic solution 30 from the fuel electrode 10, and reaches the oxygen electrode 20, and to suppress further the performance degradation of the fuel cell 1 caused by the methanol crossover.

From the above result, it is possible to utilize a high-concentration methanol solution or substantially pure methanol (methanol with a purity of 99.9% or more) as the fuel-containing fluid 50, and the high energy density characteristics that are the inherent features of DMFCs are realized. In addition, if the substantially pure methanol is used as the fuel-containing fluid 50, a concentration adjusting part can be omitted, the fuel cell system 100 can be further miniaturized, and high energy density characteristics can also be improved as the fuel cell system.

Since the fuel cell 110 does not include an electrolyte membrane as a constituent member, the problems caused as the proton-exchange fuel cell (PEFC) uses an electrolyte membrane, for example, the problems of the electrolyte membrane deteriorating due to a secular change, proton conductivity decreasing due to drying (lack of moisture) of the electrolyte membrane caused by a temperature rise, and power generation efficiency decreasing, do not exist. As a result, stable power generation is performed, without being greatly influenced by temperature and humidity. Additionally, although the electrolyte membrane has a limit to the improvement in proton conductivity, much greater proton conductivity than this conductivity can be easily realized in the electrolytic solution. Moreover, problems in the oxygen electrode, such as flooding and moisture management, can also be solved.

<Making of Fuel Cell 110>

The fuel cell 110, for example, can be manufactured as follows.

First, the fuel electrode 10 and the oxygen electrode 20 are formed similarly to the fuel cell 1. Next, an adhesive resin sheet is prepared, flow passages are formed in this resin sheet to make the electrolytic solution flow passages 80 and the fuel flow passage 60, and the resin sheet is thermo-compressed against both sides of the fuel electrode 10.

Next, similarly to the fuel cell 1, the outer packaging members 14 and 24 composed of a thin titanium plate, etc. are made, and the outer packaging member 14 is provided with the fuel inlet 14A and the fuel outlet 14B composed of, for example, a joint made of resin, and the outer packaging member 24 is provided with the electrolytic solution inlet 24A and the electrolytic solution outlet 24B composed of, for example, a joint made of resin.

Next, the fuel electrode 10 and the oxygen electrode 20 are arranged to face each other so that the fuel flow passage 60 is located outside, and the electrolytic solution flow passage 80 is sandwiched between the electrodes. Thereafter, these assemblies are housed in the outer packaging members 14 and 24. Thereby, the fuel cell 4 shown in FIG. 110 is completed.

This fuel cell 110 is assembled into the fuel cell system 100, which has the measurement unit 120, the control unit 130, the electrolytic solution supply unit 140, and the fuel supply unit 150 which have the above-described configurations. In this case, the fuel inlet 14A and the fuel outlet 14B are connected to the fuel supply unit 150 in the fuel supply line 153 composed of, for example, a silicone tube, and the electrolytic solution inlet 24A and the electrolytic solution outlet 24B are connected to the electrolytic solution supply unit 140 in the electrolytic solution supply line 143 composed of, for example, a silicone tube.

<Control of Fuel Cell 100>

In the fuel cell system 100 shown in FIG. 5, during the operation of the fuel cell 110, the operating voltage and operating current of the fuel cell 110 are measured by the measurement unit 120, and an electrolytic solution supply parameter and a fuel supply parameter are controlled as the operating conditions of the fuel cell 110 by the control unit 130 on the basis of the measurement results, whereby the operation of the fuel cell 110 is optimized.

Since the internal characteristics of DMFCs change with time, it is very difficult to operate the fuel cell 110 with optimal power generation characteristics if a fuel supply system and fuel supply means capable of fine adjustment are not provided. First, the main concept of the fuel supply control system which is required to operate DMFCs with high power generation characteristics will be described.

Figure 6:
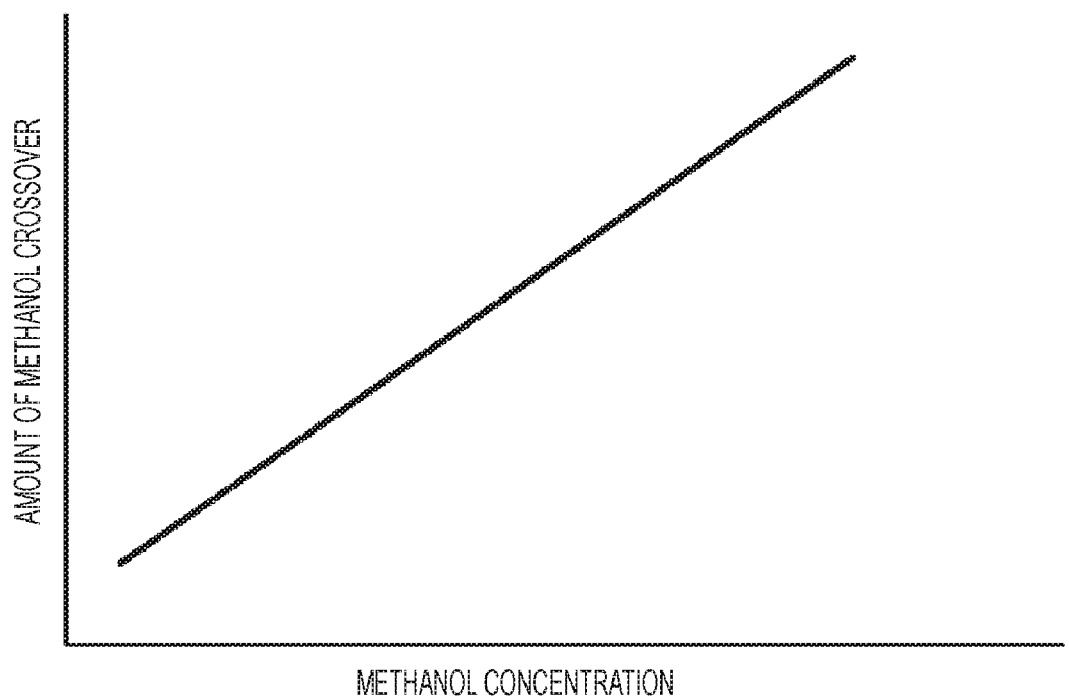
FIG. 6 is a graph showing the influence that the methanol concentration in a fuel electrode exerts on the amount of methanol crossover.

FIG. 6 is a graph showing the influence that the methanol concentration in the fuel electrode exerts on the amount of methanol crossover. If the relation in which the methanol concentration and the supply amount of methanol are proportional is established, the graph of FIG. 6 can be regarded as a graph showing the influence that the methanol concentration in the fuel electrode exerts on the amount of methanol crossover. As shown in FIG. 6, as the methanol concentration in the fuel electrode becomes higher (the supply amount of methanol becomes larger), the amount of methanol crossover increases. Accordingly, if the methanol concentration in the fuel electrode is not a suitable concentration, it is confirmed that power generation characteristics greatly degrade due to wastage of fuel caused by an increase in crossover and a drop in output voltage (refer to "Fuel Cell for Portable Devices", Technical Information Association, p. 110).

Accordingly, in order to operate DMFCs with high power generation characteristics, the fuel supply system should be a system which can always maintain an optimal fuel supply amount in correspondence with the internal characteristics of DMFCs which change every moment, and can control occurrence of methanol crossover caused by oversupply.

The measurement unit 120 shown in FIG. 5 measures the operating state of the fuel cell 110, and has, for example, a voltage measurement circuit 121 which measures the operating voltage of the fuel cell 110, a current measurement circuit 122 which measures the operating current, and a communication line 123 for feeding the obtained measurement results to the control unit 130.

Additionally, the control unit 130 controls an electrolytic solution supply parameter and a fuel supply parameter as the operating conditions of the fuel cell 110 on the basis of the measurement results of the measurement unit 120, and has a computing part 131, a storage (memory) part 132, a communication part 133, and the communication line 134. Here, the electrolytic solution supply parameter includes, for example, the supply flow velocity of the electrolytic solution 30. The fuel supply parameter may include, for example, the supply flow velocity and supply amount of the fuel-containing fluid 50, and if required, may include supply concentration. The control unit 130 can include, for example, a microcomputer.

The computing part 131 has a function of calculating the output of the fuel cell 110 from the measurement results obtained by the measurement unit 120, and setting an electrolytic solution supply parameter and a fuel supply parameter. Specifically, the computing part 131 averages a fuel electrode potential, oxygen electrode potential, output voltage, and output current which were sampled at predetermined intervals from various measurement results input to the storage part 132, thereby computing an average fuel electrode potential, an average oxygen electrode potential, an average output voltage, and an average output current, and inputs the computed results into the storage part 132. Additionally, the various average values stored in the storage part 132 are compared with each other, and the electrolytic solution supply parameter and the fuel supply parameter are determined.

The storage part 132 has a function of storing various measurement values sent from the measurement unit 120, various average values calculated by the computing part 131, etc.

The communication part 133 has a function of receiving the measurement results from the measurement unit 120 via the communication line 123, and inputting the measurement results to the storage part 132, and a function of outputting signals which set the electrolytic solution supply parameter and the fuel supply parameter in the electrolyte supply unit 140 and the fuel supply unit 150, respectively, via the communication line 134.

In the fuel cell system 100 shown in FIG. 5, during the operation of the fuel cell 110, the operating voltage and operating current of the fuel cell 110 are measured by the measurement unit 120, and the above described control of the electrolytic solution supply parameter and the fuel supply parameter are performed as the operating conditions of the fuel cell 110 by the control unit 130 on the basis of the measurement results. The measurement by the measurement unit 120 and the parameter control by the control unit 130 are repeated frequently, the supply state of an electrolytic solution 30 and the fuel-containing fluid 50 is optimized while following the characteristic fluctuation of the fuel cell 110.

Additionally, although the configurations of the fuel electrode 10, the oxygen electrode 20, the fuel flow passage 60, and the electrolytic solution flow passages 80 have been specifically described in the above embodiments, the embodiment may be configured by other structures or other materials. For example, although the fuel flow passage 60 has been formed by working on a resin sheet as described in the above embodiments to form the flow passage, the fuel flow passage may be formed of a porous sheet.

Additionally, the material, thickness, etc. of respective components described in the above embodiments are not limited, and other materials and thicknesses may be adopted.

Additionally, in the above embodiments, fuel is supplied to the fuel electrode 10 from the fuel supply unit 150. However, a hermetic type may be used as the fuel electrode 10 so that fuel is supplied if needed.

Additionally, in the above embodiments, the supply of air to the oxygen electrode 20 is naturally ventilated. However, the air may be forcibly supplied using a pump, etc. In that case, instead of air, gas including oxygen may be supplied.

Additionally, although a single cell type fuel cell has been described in the above embodiments, the embodiments can also be applied to a laminated type in which a plurality of cells is laminated.

Additionally, although the case where the ionic conductor is applied to a fuel cell has been described in the above embodiments, the embodiments can also be applied to electrochemical devices, such as a capacitor, a combustible substance sensor, or a display, in addition to the fuel cell.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electrolytic solution arranged between a first electrode and a second electrode of an electrochemical device configured so that the first electrode and the second electrode are arranged to face each other, a first reactant supplied toward the first electrode, and a second reactant supplied toward the second electrode perform oxidation reduction reactions via the first electrode and the second electrode, wherein catalyst particulates are contained in a dispersed state, and a first reactant which does not react on the first electrode and diffuses through the electrolytic solution to move to the second electrode, and a second reactant which does not react on the second electrode and diffuses through the electrolytic solution to move to the first electrode are configured so that reactions that cancel each other by the oxidation reduction reactions are promoted by the catalyst particulates.

2. The electrolytic solution according to claim 1, wherein a particle diameter of the catalyst particulates is 100 nm or less.

3. The electrolytic solution according to claim 1, wherein the catalyst particulates include at least one kind selected from the group consisting of platinum, ruthenium, palladium, and gold.

4. The electrolytic solution according to claim 1, wherein the first reactant is alcohol or hydrogen, and the second reactant is oxygen.

5. The electrolytic solution according to claim 1, wherein the electrolytic solution is an acidic electrolytic solution.

6. The electrolytic solution according to claim 1, wherein an electrolyte is at least one kind selected from the group consisting of an inorganic acid, an organic acid, or hydrogen ion dissociative solid particulates.

7. The electrolytic solution according to claim 6, wherein an electrolyte is at least one kind selected from the group consisting of a sulfuric acid, a sulfonic acid-based organic compound, or sulfonic acid-based cation-exchange-resin particulates.

8. The electrolytic solution according to claim 6, wherein at least a portion of the organic acid is adsorbed on the surfaces of the catalyst particulates.

9. The electrolytic solution according to claim 1, wherein the electrolytic solution is a basic electrolytic solution.

10. The electrolytic solution according to claim 9, wherein an electrolyte is at least one kind selected from the group consisting of an inorganic base, an organic base, or hydroxide ion dissociative solid particulates.

11. The electrolytic solution according to claim 10, wherein an electrolyte is at least one kind selected from the group consisting of hydroxide of an alkali metal, a quaternary ammonium compound, or quaternary ammonium compound-based anion exchange particulates.

12. The electrolytic solution according to claim 10, wherein at least a portion of the organic base is adsorbed on the surfaces of the catalyst particulates.

13. The electrolytic solution according to claim 1, wherein the electrochemical device is a fuel cell.

14. An electrochemical device, wherein the electrolytic solution according to claim 1 is arranged between the first electrode and the second electrode which face each other.

15. The electrochemical device according to claim 14, wherein a gas liquid separation film is provided on a surface of the first electrode facing a supply passage of the first reactant.

16. The electrochemical device according to claim 14, wherein the electrolytic solution flows between the first electrode and the second electrode.

17. The electrochemical device according to claim 16, wherein the flow of the electrolytic solution is a laminar flow.

18. The electrochemical device according to claim 14, wherein the electrolytic solution which has finished flowing between the first electrode and the second electrode is reused.

19. The electrochemical device according to claim 18, wherein a means which removes the first reactant and/or the second reactant from the electrolytic solution which has finished flowing prior to the reuse is provided.

20. The electrochemical device according to claim 14, wherein the electrochemical device is a fuel cell.

\* \* \* \* \*